US010895068B1

(12) United States Patent
Capizzi

(10) Patent No.: US 10,895,068 B1
(45) Date of Patent: Jan. 19, 2021

(54) WATER SHUTOFF APPARATUS

(71) Applicant: Gregory Capizzi, Point Pleasant, NJ (US)

(72) Inventor: Gregory Capizzi, Point Pleasant, NJ (US)

(*) Notice: Subject to any disclaimer, the term of this patent is extended or adjusted under 35 U.S.C. 154(b) by 0 days.

(21) Appl. No.: 16/680,598

(22) Filed: Nov. 12, 2019

(51) Int. Cl.
E03D 5/02 (2006.01)
G08B 21/20 (2006.01)
E03D 11/00 (2006.01)

(52) U.S. Cl.
CPC .............. E03D 5/026 (2013.01); E03D 11/00 (2013.01); G08B 21/20 (2013.01)

(58) Field of Classification Search
CPC ......... E03D 11/00; E03D 5/026; E03F 5/0408
USPC ............................................................. 4/427
See application file for complete search history.

(56) References Cited

U.S. PATENT DOCUMENTS

| | | | |
|---|---|---|---|
| 6,058,519 A | 5/2000 | Quintana | |
| 6,178,569 B1 | 1/2001 | Quintana | |
| 6,367,096 B1 * | 4/2002 | Quintana | .................. E03D 1/00 4/427 |
| 6,671,894 B1 | 1/2004 | Sigrist | |
| 6,810,902 B2 * | 11/2004 | Bootka | .................. E03C 1/242 137/312 |
| 6,934,977 B1 | 8/2005 | Quintana et al. | |
| 9,068,331 B2 | 6/2015 | Blom | |
| 9,779,617 B2 | 10/2017 | Viswanathan | |
| 2004/0199989 A1 * | 10/2004 | Trolio | ....................... E03D 1/00 4/427 |
| 2007/0157374 A1 | 7/2007 | Morris | |
| 2011/0258766 A1 | 10/2011 | Cousineau | |

OTHER PUBLICATIONS

Water Leak Detection Detector Alarm System with Motorized Valve, http://www.tonheflow.com/water-leak-controller/water-leak-detection-detector-alarm-system-with-motorized-valve.html, retrieved Nov. 11, 2019, 10 pages.

* cited by examiner

Primary Examiner — Lauren A Crane
(74) Attorney, Agent, or Firm — Greenberg Traurig, LLP

(57) ABSTRACT

An apparatus includes a housing, a valve located within the housing, the valve being adapted to fluidly connect to an external toilet and an external water supply that provides water to the toilet, and a water sensor. The valve includes an open position, in which the water supply is enabled to supply water to the toilet, and a closed position, in which the external water supply is prevented from supplying water to the toilet. The water sensor is electrically connected to the valve and is operable between an inactivated state, in which the water sensor is substantially dry, and an activated state, in which the water sensor is subjected to an amount of water. When the water sensor is in its activated state, the valve is moved to its closed position to cut off the water supply to the toilet.

18 Claims, 6 Drawing Sheets

US 10,895,068 B1

WATER SHUTOFF APPARATUS

FIELD OF THE INVENTION

The present invention relates to water shut off apparatus and, more particularly, automatic toilet water shutoff apparatus.

BACKGROUND OF THE INVENTION

Water from an overflowing toilet is unsanitary and can cause extensive damage to real property. Such damage is magnified in multi-family dwellings, such as apartment buildings and condominiums, where the escaping water from the overflowing toilet in a dwelling unit seeps through the floor and into the ceiling and walls of a dwelling unit located directly below. An occupant of the unit with the overflowing toilet may not realize the situation until it is too late and extensive mess and/or property damage has occurred. This could be extraordinary should the occupants of the units both with the overflowing toilet and/or below not be present, which would lead to more damage. What is needed is a toilet water shutoff apparatus that automatically shuts off the water supply to a toilet that is overflowing.

SUMMARY OF THE INVENTION

In an embodiment, an apparatus, comprising a housing; a valve located within the housing, the valve being adapted to fluidly connect to an external toilet and an external water supply that provides water to the toilet, wherein the valve includes an open position, in which the water supply is enabled to supply water to the toilet, and a closed position, in which the external water supply is prevented from supplying water to the toilet; and a water sensor electrically connected to the valve, wherein the water sensor is operable between an inactivated state, in which the water sensor is substantially dry, and an activated state, in which the water sensor is subjected to an amount of water, wherein when the water sensor is in its activated state, the valve is moved to its closed position.

In an embodiment, the valve is an electric motorized valve. In an embodiment, the apparatus further includes a controller electrically connected to the valve for controlling the operation of the valve. In an embodiment, the water sensor is positioned external and remote from the housing and is electrically connected to the controller. In an embodiment, the water sensor is electrically connected to the controller by an elongated wire. In an embodiment, the water sensor is adapted to be positioned proximate to a base of the toilet. In an embodiment, the water sensor is adapted to be positioned on a floor of a structure. In an embodiment, the water sensor includes a pair of leads, and wherein the amount of water provides an electrical connection between the leads when the water sensor is in its activated state. In an embodiment, the amount of water is originated from the toilet.

In an embodiment, the controller includes a control panel. In an embodiment, the apparatus further comprises a first hose for fluidly connecting the valve to the external water supply, and a second hose for fluidly connecting the valve to the toilet. In an embodiment, the valve includes a valve body having a first end and a second end opposite the first end, a first fitting connected to the first end of the valve, a second fitting connected to the second end of the valve, a first tube connected to the first fitting, a second tube connected to the second fitting, a third fitting connected to the first tube and the first hose, and a fourth fitting connected to the second tube and the second hose.

In an embodiment, the apparatus a first electrical connector electrically connected to the control panel, and a second electrical connector electrically connected to the valve, and wherein the first and second electrical connectors are adapted to removably mate with one another. In an embodiment, the housing includes a base and a cover removably attached to the base, the cover having an external surface, and wherein the control panel is positioned within the cover and accessible by a user from the external surface thereof.

In an embodiment, the apparatus further comprises a power supply. In an embodiment, the power supply includes at least one battery. In an embodiment, the control panel includes at least one visual indicator indicating the status of the valve being either in its open position or its closed position, and an audible indicator indicating the valve being in its closed position. In an embodiment, the housing is adapted to be removably attached to a wall of a structure and positioned proximate to and intermediate the water supply and the toilet. In an embodiment, the water sensor is removably attached to the valve. In an embodiment, the apparatus is adapted to wirelessly communicate with a remote computer to provide visual and audible alerts to the computer concerning a status of the apparatus.

In an embodiment, an apparatus, comprising a housing, a valve located within the housing, the valve being adapted to fluidly connect to an external appliance and an external water supply that provides water to the appliance, wherein the valve includes an open position, in which the water supply is enabled to supply water to the appliance, and a closed position, in which the external water supply is prevented from supplying water to the appliance; and a water sensor electrically connected to the valve, wherein the water sensor is operable between an inactive state, in which the water sensor is substantially dry, and an active state, in which the water sensor is subjected to an amount of water, wherein when the water sensor is in its active state, the closed position of the valve is activated and maintained.

DETAILED DESCRIPTION OF THE DRAWINGS

Figure 1:
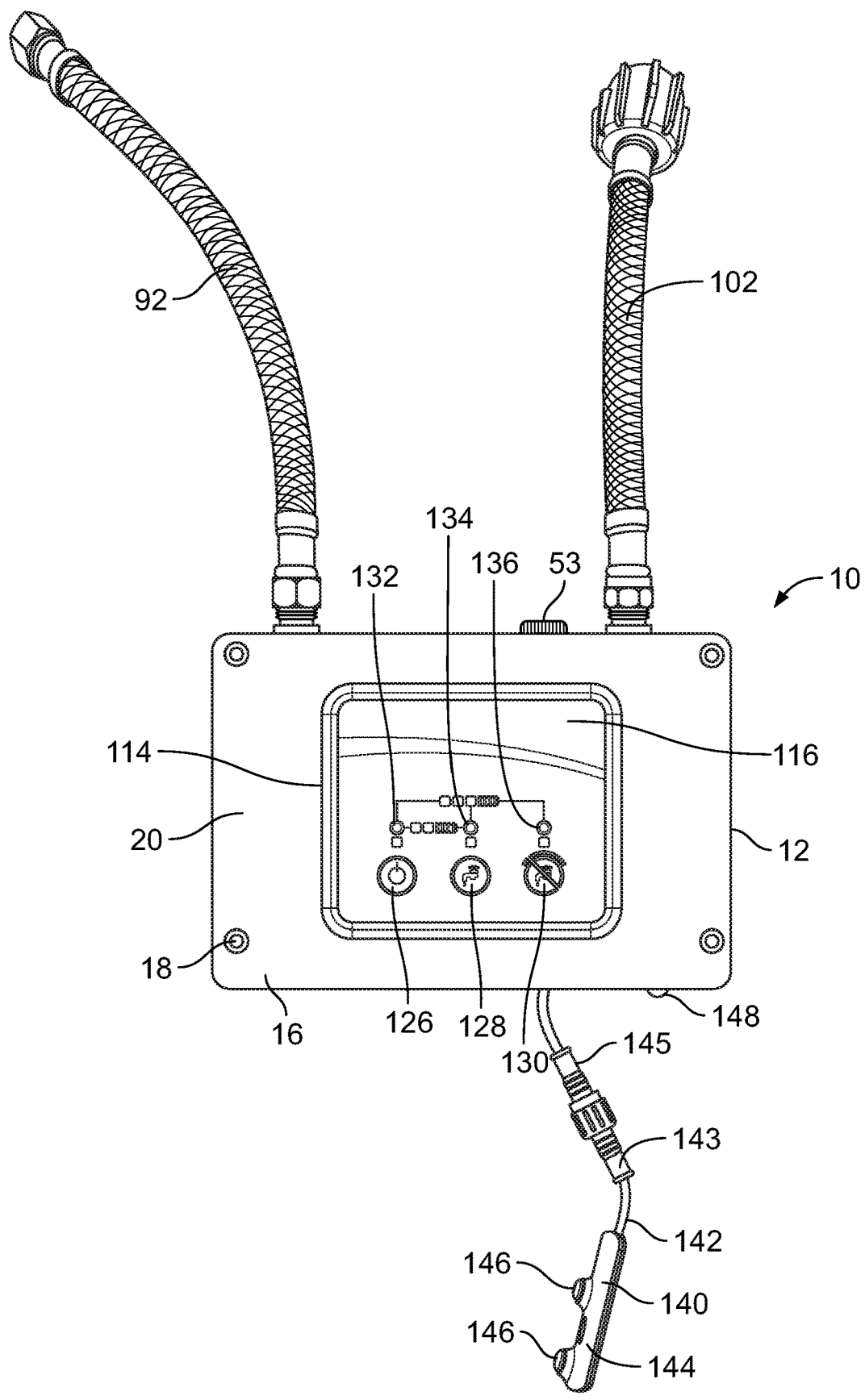
FIG. 1 is a front elevational view of an embodiment of a toilet water shutoff apparatus.
Figure 2:
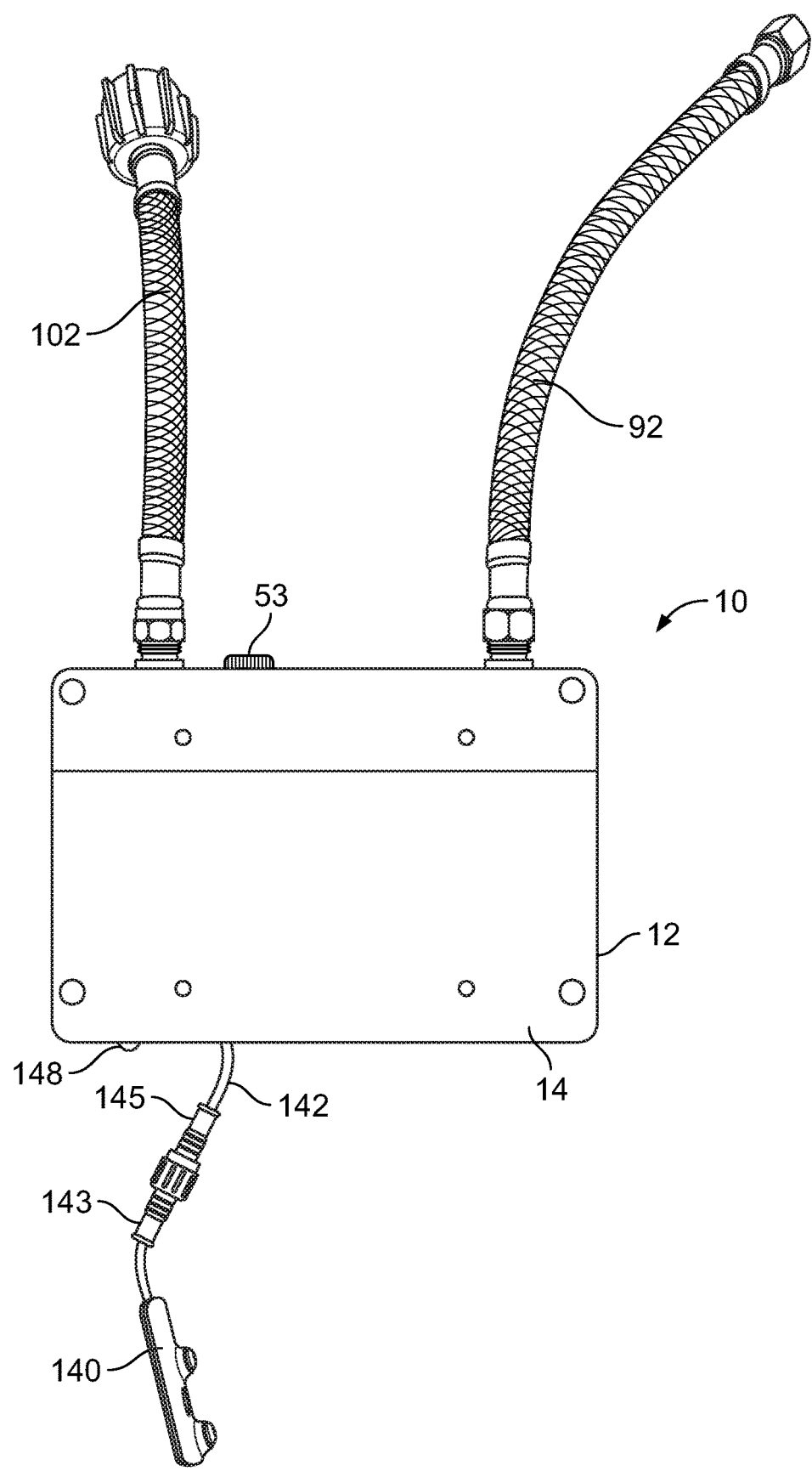
FIG. 2 is a rear elevational view of the toilet water shutoff apparatus of FIG. 1.

Referring to FIGS. 1 through 4, in an embodiment, a water shutoff apparatus 10 includes a housing 12 having a base 14 and a cover 16 removably attached to the base 14. In an embodiment, the cover 16 is removably attached to the base 14 by a plurality of fasteners 18, such as screws or captive panel fasteners. In another embodiment, the cover 16 is removably attached to the base 14 by other suitable means known in the art, such as snap-fit tabs and joints, hinges, or by interference fit. In an embodiment, a seal such as a gasket, is positioned between the base 14 and the cover 16 to ensure a water-tight seal (not shown in the Figures). In an embodiment, the cover 16 includes a front side 20 and a rear side 22 opposite the front side 20. In an embodiment, the housing 12 includes a top wall 24, a bottom wall 26 opposite the top wall 24, and a pair of sidewalls 28, 30 that extend from the top wall 24 to the bottom wall 26. In an embodiment, the top wall 24 of the housing 12 includes first and second openings 32, 34 spaced apart from one another, one of which is positioned proximate to the sidewall 28 and the other of which is positioned proximate to the sidewall 30. In an embodiment, each of the openings 32, 34 is circular in shape. In an embodiment, the top wall 24 includes a third opening 36 positioned intermediate the first and second openings 32, 34. In an embodiment, the bottom wall 26 includes an opening 38 positioned intermediate the sidewalls 28, 30 (see FIG. 4). In an embodiment, the housing 12 includes an interior chamber 40 for housing certain components of the apparatus 10, which will be described hereinafter.

In an embodiment, the housing 12 is made from plastic. In an embodiment, the housing 12 is made from a thermoplastic polymer. In an embodiment, the housing 12 is made from acrylonitrile butadiene styrene. In another embodiment, the housing 12 is made of metal. In an embodiment, the housing 12 is made of stainless steel. In an embodiment, the housing 12 may consist of any desired color. In an embodiment, the housing 12 includes a rectangular-shaped cross section. In another embodiment, the housing 12 includes a square-shaped cross section. In another embodiment, the housing 12 includes a circular-shaped cross section. In another embodiment, the housing 12 may consist of other suitable or customized shapes.

Figure 3:
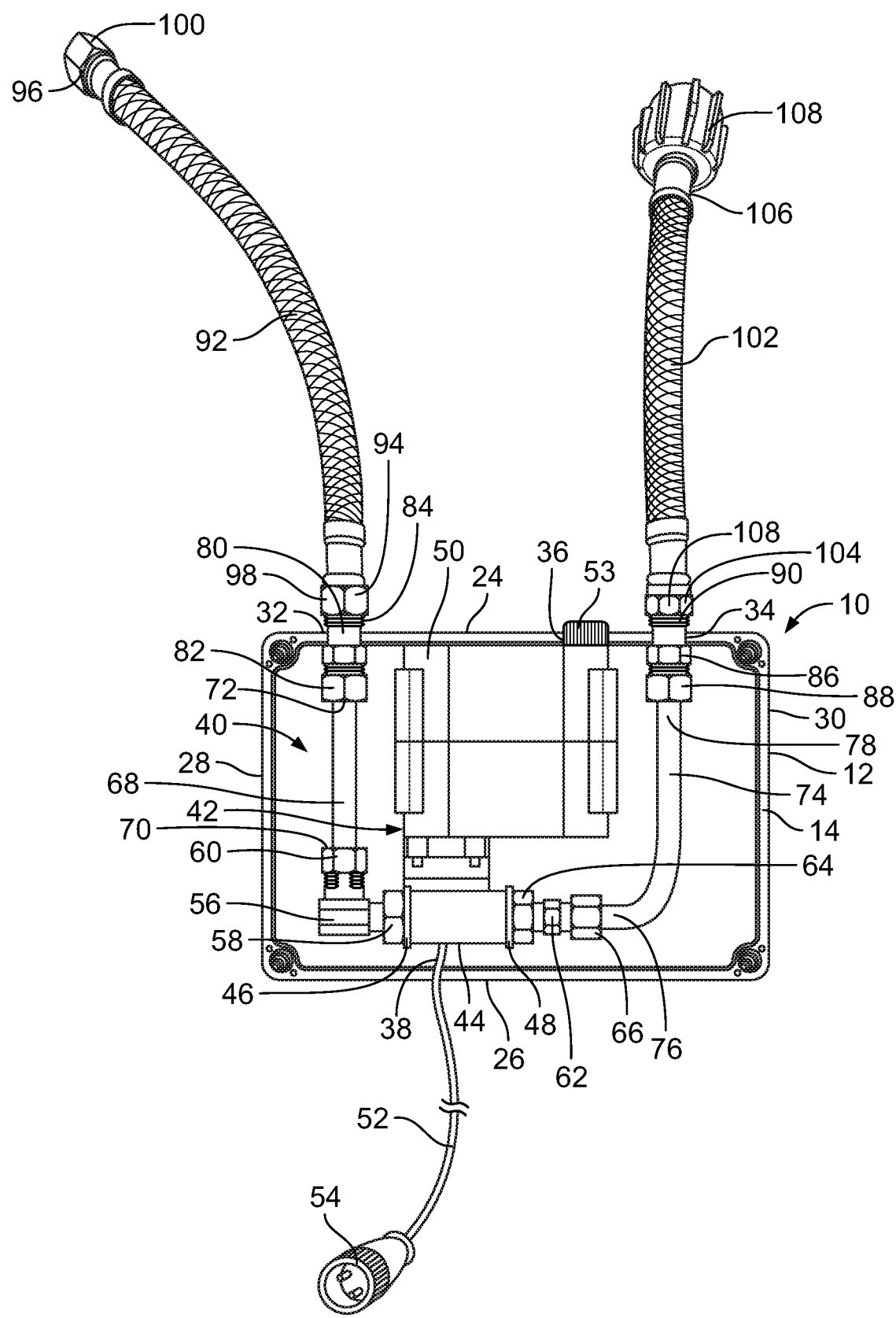
FIG. 3 is a front elevational view of the toilet water shutoff apparatus of FIG. 1 with a front cover employed by the apparatus removed.

Referring to FIG. 3, in an embodiment, the apparatus 10 includes a valve 42 mounted within the housing 12. In an embodiment, the valve 42 is an electric, motorized ball valve. In an embodiment, the valve 42 includes a valve body 44 having a first end 46 and a second end 48 opposite the first end 46, and an actuator 50 connected to the valve body 44 intermediate the first and second ends 46, 48 thereof. In an embodiment, the actuator 50 facilitates the opening and closing the valve 42. In an embodiment, the valve 42 includes a dial 53 In an embodiment, each of the first and second ends 46, 48 of the valve body 44 include internal threads (not shown in the Figures). In an embodiment, the actuator 50 includes a cable 52 having a male connector 54. In an embodiment, the male connector 54 is a pin connector. In an embodiment, the valve 42 is a component of an electric automatic valve and water leak detector manufactured by Tonhe of China, model number W8-B2-B or model number W15-62-C. In other embodiments, the valve 42 may be made by other manufacturers or consist of other models of electric motorized ball valves. In other embodiments, the valve 42 may consist of a solenoid valve.

Still referring to FIG. 3, in an embodiment, the apparatus 10 includes a first fitting 56 having a first end 58 and a second end 60, and a second fitting 62 having a first end 64 and a second end 66. In an embodiment, the first fitting 56 is a male elbow brass fitting, while the second fitting 62 is a male union brass fitting. In other embodiments, the first and second fittings 56, 62 may consist of other suitable fittings. In an embodiment, the first end 58 of the first fitting includes external threads and is threadedly connected to the first end 46 of the valve body 44 of the valve 42, while the first end 64 of the second fitting 62 includes external threads and is threadedly connected to the second end 48 of the valve body 44. In an embodiment, a first tube 68 includes a first end 70 and a second end 72 opposite the first end 70, the first end 70 being connected to the second end 60 of the first fitting 56 and the second end 72 being connected to a first end 82 of a third fitting 80. In an embodiment, a second tube 74 includes a first end 76 and a second end 78, the first end 76 being connected to the second end 66 of the second fitting 62 and the second end 78 of the second tube 74 being connected to a first end 88 of a fourth fitting 86. In an embodiment, the first and second tubes 68, 74 are each copper tubing. In an embodiment, the first tube 68 is linear, while the second tube 74 has a J-shape. In an embodiment, each of the third and fourth fittings 80, 86 is a male union brass fitting. In other embodiments, the third and fourth fittings 80, 86 may consist of other suitable fittings. In an embodiment, the third fitting 80 extends through the first opening 32 of the housing 12, while the fourth fitting 86 extends through the second opening 34 of the housing 12.

Still referring to FIG. 3, in an embodiment, the apparatus 10 includes a first hose 92 having a first end 94 and a second end 96 opposite the first end 94, the first end 94 including a threaded coupling 98 that is threadedly connected to a second end 84 of the third fitting 80, and the second end 96 including a second threaded coupling 100 being adapted to threadedly connect to a toilet water supply valve, which will be discussed hereinafter. In an embodiment, a second hose 102 includes a first end 104 and a second end 106 opposite the first end 104, the first end 106 having a first threaded coupling 108 that is threadedly connected to a second end 90 of the fourth fitting 86, and the second end 106 including a ballcock nut 112 that is adapted to threadedly connect to a shank of a toilet fill valve that extends from a bottom of a toilet tank, which shall be described hereinafter. In an embodiment, the ballcock nut 112 may be replaced with another suitable coupling. In an embodiment, each of the first and second hoses 92, 102 is a braided polymer toilet connection hose. In an embodiment, each of the hoses 92, 102 is a ⅜-inch size hose. In another embodiment, each of the hoses 92, 102 is a ¼-inch size hose. In other embodiments, the hoses 92, 102 may consist of other sizes. In an embodiment, each of the fittings 56, 62, 80, 86 is a ⅜-inch size fitting. In another embodiment, each of the fittings 56, 62, 80, 86 is a ¼-inch size fitting. In other embodiments, the fittings 56, 62, 80, 86 may consist of other sizes.

Figure 4:
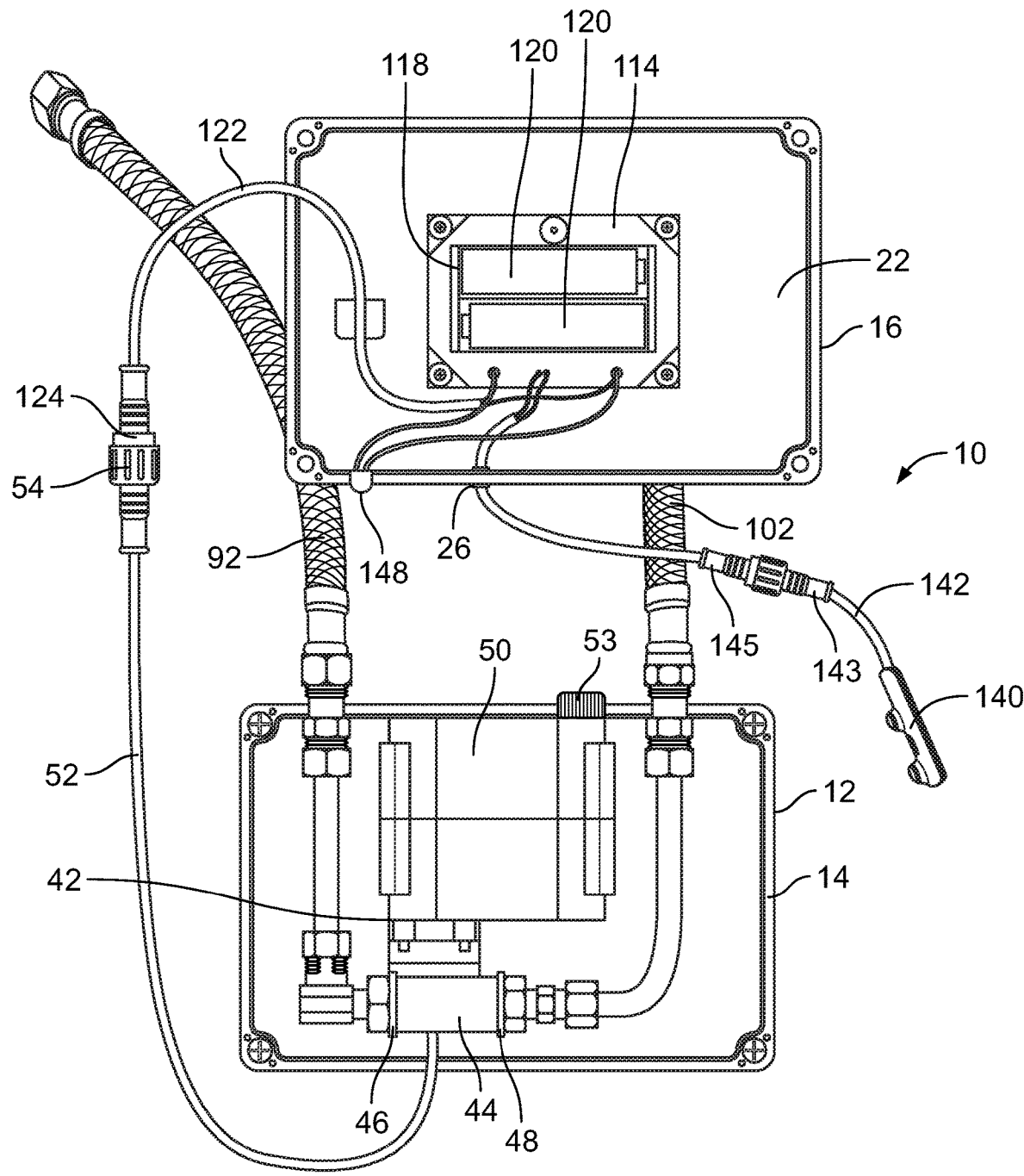
FIG. 4 is a front elevational view of the toiler water shutoff apparatus of FIG. 1 with the front cover removed, but with an associated control panel and power supply mounted to the front cover shown electrically connected to a solenoid valve housed in a base.

Referring to FIGS. 1 and 4, in an embodiment, the apparatus 10 includes a controller 114 mounted to the cover 16. In an embodiment, the controller 114 includes a control panel 116 accessible from the front side 20 of the cover 16, and battery compartment 118 accessible from the rear side 22 of the cover 16. In an embodiment, the battery compartment 118 is adapted to receive at least one battery 120 for providing power to the controller 114 and the valve 42. In an embodiment, the battery compartment 118 is adapted to receive a plurality of the batteries 120. In an embodiment, the batteries 120 are AA batteries. In other embodiments, the batteries 120 are 9-volt batteries, AAA batteries, 3.5 volt batteries, lithium batteries, or any other standard batteries suitable for providing power to the apparatus 10. In another embodiment, the controller 114 need not include the battery compartment 118 and a separate battery compartment may be positioned elsewhere within the housing 12 and, optionally, accessible through a door or panel in the front 20 of the cover 16 (not shown in the Figures). In another embodiment, the apparatus 10 may be hardwired into a structure's electrical system. In another embodiment, the apparatus 10 may include a standard electrical plug for electrical connection to a standard power outlet. In an embodiment, the controller 114 includes a cable 122 having a female connector 124 that is adapted to mate with the male connector 54 of the cable 52. In an embodiment, the cables 52, 122 and connectors 54, 124 are housed within the housing 12. In an embodiment, the controller 114 is a component of an electric automatic valve and water leak detector manufactured by Tonhe of China, model number W8-B2-B or model number W15-B2-C. In other embodiments, the controller 114 may be made by other manufacturers or consist of other models of suitable controllers.

In an embodiment, the control panel 116 includes a power button 126, a valve open button 128, and a valve closed button 130, along with associated power indicator light 132, valve open light 134, and valve closed light 136. In an embodiment, the battery life indicator may be indicated by lights 132 and 134, which illuminate when the batteries 120 are low. In an embodiment, the cover 16 includes an illumination source 148 electrically connected to the controller 114 for illumination of the apparatus 10 and the associated room or structure. In an embodiment, the illumination source is located within the bottom wall 26 of the cover 16. In other embodiments, the illumination source 148 may be located on the other walls 24, 28, 30 or front face 20 of the cover. In an embodiment, the illumination source 148 is an LED light. In other embodiments, the illumination source 148 may include a plurality of lights, such as multiple LEDs or an LED strip. In an embodiment, the illumination source 148 can be powered on or off by a user from the control panel.

Still referring to FIGS. 1 and 4, in an embodiment, the apparatus 10 includes a flood water sensor 140 that is electrically connected to the controller 114 by a wire 142. In an embodiment, the wire 142 extends through the bottom opening 38 of the housing 12. In an embodiment, the wire 142 includes a male connector 143 and a female connector 145 that is sized and shaped to removably mate with the male connector 143. In an embodiment, the sensor 140 is removably attached to the wire 142 and the sensor 140 is replaceable by disconnecting it from the wire 142 by disconnecting the male and female connectors 143, 145 from one another. In an embodiment, the sensor 140 includes a body 144 and a pair of leads 146 extending from the body 144. In an embodiment, the body 144 of the sensor 140 is substantially flat. In other embodiments, other water sensors may be used.

Figure 5:
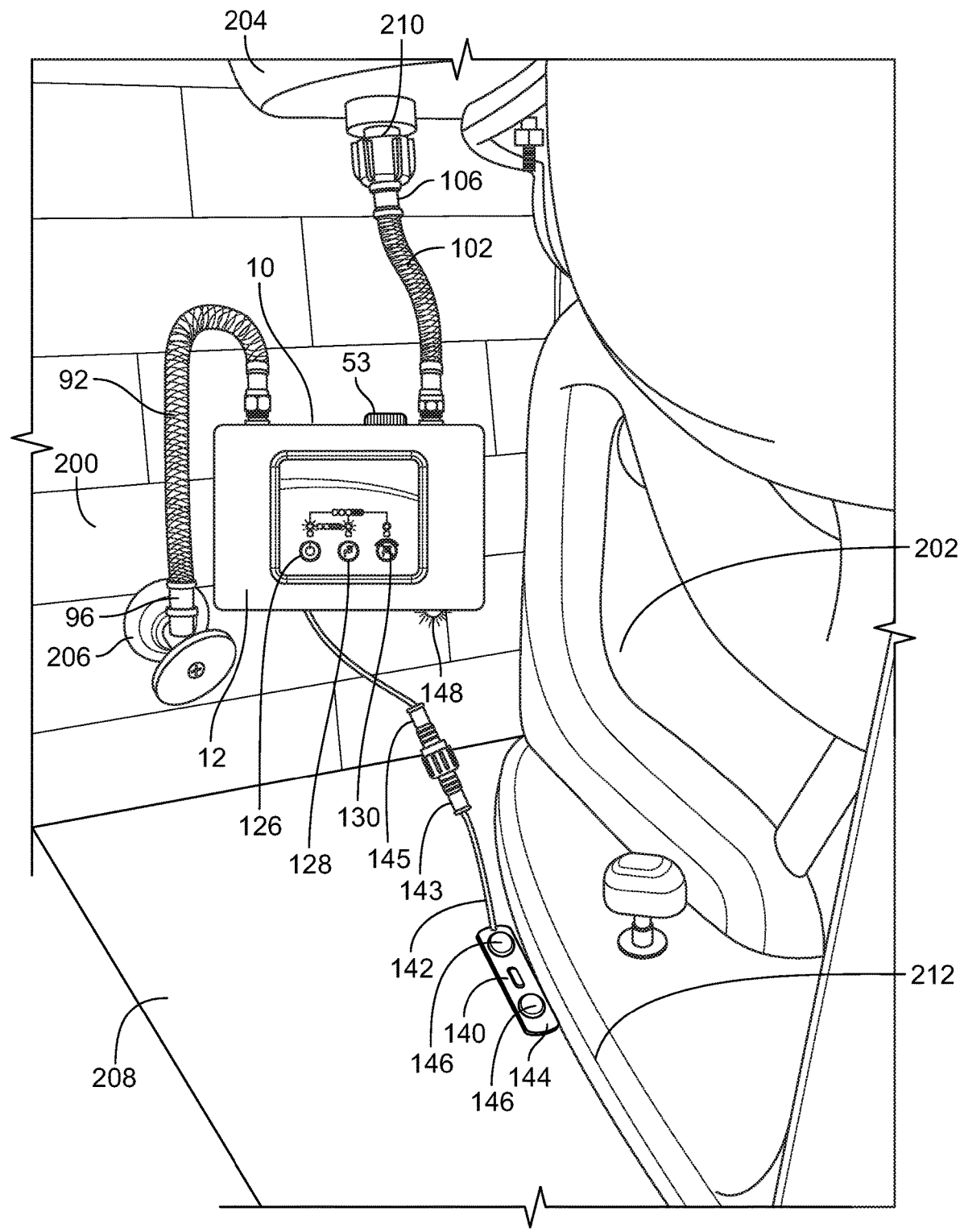
FIG. 5 is a perspective view of the toilet water shutoff apparatus mounted to a wall and connected to a toilet and toilet water supply line, the apparatus being shown with the valve in an open position by an associated visual indicator and the toilet operating normally.

Referring to FIG. 5, in an embodiment, the apparatus 10 is installed on a wall 200 proximate to a toilet 202 and, preferably, beneath a tank 204 of the toilet 200, and proximate to a water supply valve 206. In an embodiment, the apparatus 10 and particularly the housing 12 is removably attached to the wall 200 by fasteners. In another embodiment, the housing 12 is removably attached to the wall 200 by double-sided tape. In another embodiment, the housing 12 is removably attached to the wall 200 by an adhesive. In another embodiment, the housing 12 is removably attached to the wall 200 by hook and loop fasteners. In other embodiments, the housing 12 is removably attached to the wall 200 by other suitable means known in the art. Preferably, the housing 12 is installed level with a bathroom floor 208. As indicated above, the second end 96 of the first hose 92 is attached to the water supply valve 206, while the second end 106 of the second hose 102 is attached to a shank 210 of a fluid valve unit of the toilet 202, which resides within the tank 204 (not shown in the Figures). The water supply valve 206 is engaged in its open position to facilitate the flow of water through the first hose 92, the valve 42 and the second hose 102 into fluid valve unit to supply water to the tank 204.

In an embodiment, the water sensor 140 is positioned preferably on the surface of the floor 208 proximate to the toilet 202. In an embodiment, the water sensor 140 is juxtaposed with a base 212 of the toilet 202. In an embodiment, the sensor 140 is approximately ⅛ inch in thickness. In another embodiment, the sensor is approximately 1/16 inch in thickness. In another embodiment, the sensor 140 is attached to the surface of the floor 208. In another embodiment, the sensor 140 is attached to the side of the base 212 of the toilet 202, but proximate to the surface of the floor 208. In an embodiment, the sensor 140 is preferably removably attached to the floor 208 or to the base 212 of the toilet 202 to maintain its position near or close to the toilet 202. In an embodiment, the sensor 140 is attached to the floor 208 or to the base 212 of the toilet 202 by an adhesive. In an embodiment, the sensor 140 is attached to the floor 208 or to the base 212 of the toilet 202 by double-sided tape or sticky strips. In an embodiment, the wire 142 of the sensor 140 has a length suitable for the sensor 140 to be positioned in any position on the floor 208 near the toilet 202 or on the toilet 202 proximate to the floor 208.

Figure 6:
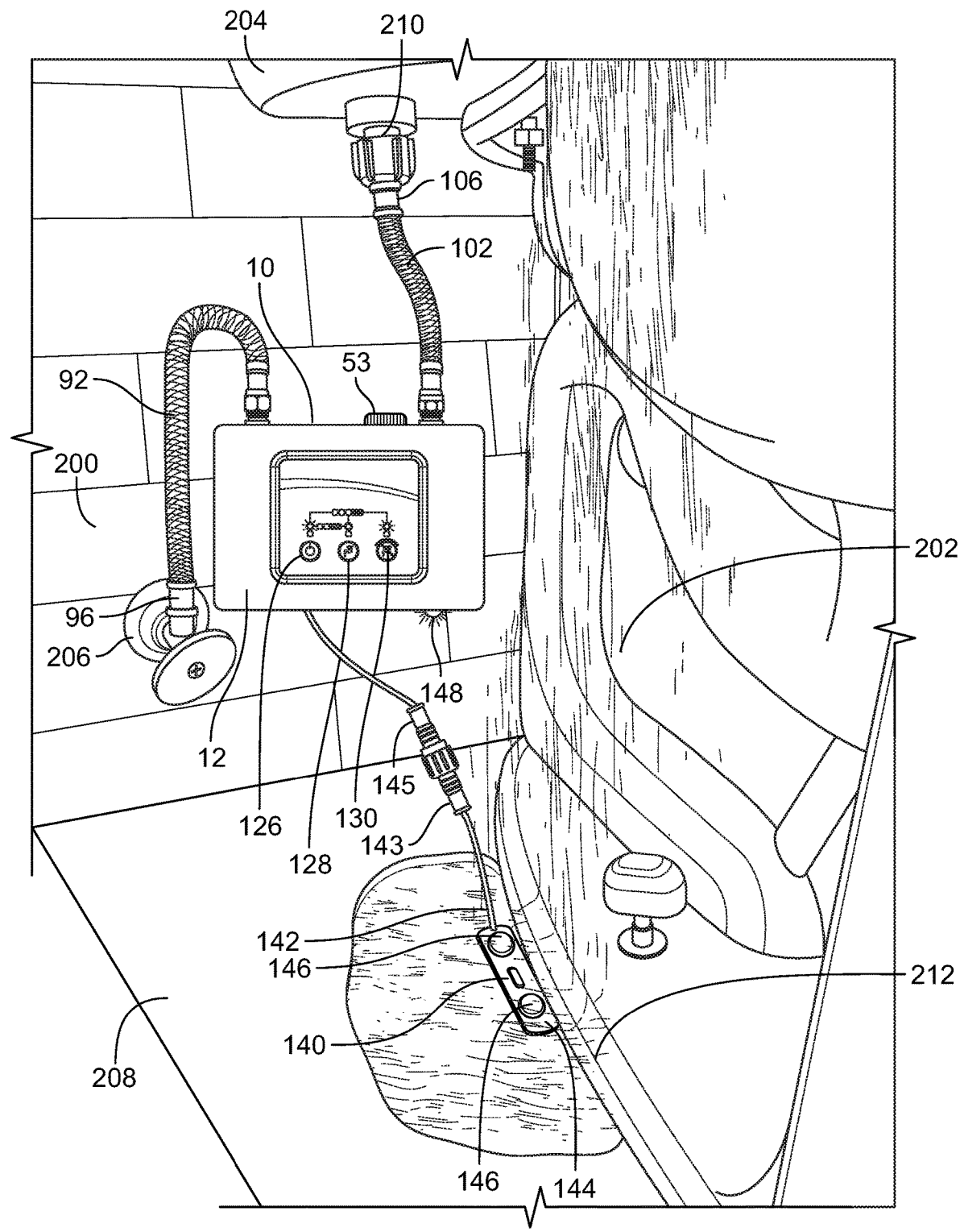
FIG. 6 is a perspective view of the toilet water shutoff apparatus shown in FIG. 5, but shown with the valve in a closed position by an associated visual indicator as a result of the toilet overflowing with water.

In an embodiment, the apparatus 10 is powered on by pushing the power button 126 on the control panel 116. The valve open button 128 is depressed to open the valve 42 to its open position, via the actuator 50. Water flows from the supply valve 206 through the first hose 92, the valve 42 and the second hose 102 into fluid valve unit to supply water to the tank 204 when the valve 42 is in its open position. With reference to FIG. 6, in the event of water overflowing from and over the rim the bowl of the toilet 202, such as from a stuffed or blocked toilet or faulty hardware; or from water from the tank 204 of the toilet 202 due to faulty or leaky hoses, gaskets or cracks in the tank, some water will start to accumulate around the base 212 of the toilet 202. As shown in FIG. 6, the overflowed water will contact the leads 146 of the sensor 140, which closes the circuit of the sensor 140. In turn, the sensor 140 signals the controller 114 to engage the actuator 50 to shut the valve 42 from its open position to a closed position, such that the water flow through the apparatus 10 ceases and, in turn, further water flow to the toilet 202 ceases, thereby preventing a large accumulation or flood of water on the floor 208 and further preventing damage to the floor 208, surrounding walls, and any other structural elements located below the associated bathroom. With reference to multiple unit and multiple level apartment buildings and condominiums, flood damage to dwelling unit ceilings and walls located below the unit with the subject overflowing toilet is avoided, thus saving time and expense for costly repairs. In an embodiment, when the sensor 140 is activated, the controller engages an audible alarm to alert a user of a toilet overflow situation. In addition, the valve off light 136 is engaged notifying a user visually that the valve 42 is in its closed position.

Once the toilet overflow situation has been rectified, the sensor 140 may be dried. The apparatus 10 is reset by manually resetting the valve 42 from its closed position to its open position by depressing the valve open button 128 on the control panel 116, thus re-promoting the flow of water though the apparatus 10 and to the toilet tank 204. In another embodiment, the valve 42 can be opened or closed by manually turning the dial of the actuator 50. If the batteries 120 are low or out of power or the power is cut off from the apparatus 10, the valve 42 will automatically close for safety and precautionary purposes. In an embodiment, a user can manually open and close the valve 42 via the dial 55 as necessary, for instance, if there is no power to valve 42 (e.g., dead batteries 120; electrical malfunction; etc.). In an embodiment, if the sensor 140 becomes faulty, broken or worn, or outdated, the sensor 140 may be replaced by disconnecting it from the wire 142 by disconnecting the male and female connectors 143, 145 from one another and replacing it with a new sensor 140 or a different type of water sensor.

In an embodiment, the apparatus 10 is adapted to wirelessly, electronically connect to and communicate with, via Wi-Fi or other electronic signal, a remote computer, such as a personal computer, computer tablet, smart phone, smart watch, or similar personal electronic devices, to provide visual and audible alerts to a user on such personal devices, such as a toilet overflow condition where the sensor 140 is activated and the valve 42 closes. A user may control the apparatus 10 via such personal device. In an embodiment, the apparatus 10 may include a camera and associated camera lens on the housing that provides a user with real time visual alerts of the bathroom floor and surround areas on her personal electronic smart device's screen. In another embodiment, the apparatus 10 can provide signals and alerts to a central station having a computer system for monitoring multi-dwelling and multi-family units (e.g., apartment buildings, townhouses, and condominiums), such as a real estate superintendent, building maintenance, management company, or other property manager, thus significantly reducing the time between a toilet overflow condition and such personnel receiving the alerts and addressing the condition.

The embodiments described herein are merely exemplary and that a person skilled in the art may make many variations and modifications without departing from the spirit and scope of the invention. For example, in certain embodiments, the apparatus 10 can be constructed such that the hoses 92, 102 and the associated fittings 56, 62, 80, 86 and tubes 68, 74 extend from any one or other sides or bottom wall 26 and/or sidewalls 28, 30 of the housing 12, depending upon the arrangement and configuration of the water supply valve 206 and the toilet 202. In another embodiment, the housing 12 can comprise various sizes and shapes, can be compact, and colors for matching the associated color scheme of the toilet 202 and bathroom.

All such variations and modifications are intended to be included within the scope of the invention as defined in the appended claims.

What is claimed is:

1. An apparatus, comprising a housing; a valve located within the housing, the valve being adapted to fluidly connect to an external toilet and an external water supply that provides water to the toilet, wherein the valve includes an open position, in which the water supply is enabled to supply water to the toilet, and a closed position, in which the external water supply is prevented from supplying water to the toilet; and a water sensor electrically connected to the valve, wherein the water sensor is operable between an inactivated state, in which the water sensor is substantially dry, and an activated state, in which the water sensor is subjected to an amount of water, wherein when the water sensor is in its activated state, the valve is moved to its closed position, wherein the water sensor is adapted to be positioned on a base of the toilet proximate to a floor of a structure.

2. The apparatus of claim 1, wherein the valve is an electric motorized valve.

3. The apparatus of claim 2, further comprising a controller electrically connected to the valve for controlling the operation of the valve.

4. The apparatus of claim 3, wherein the water sensor is external and remote from the housing and is electrically connected to the controller.

5. The apparatus of claim 4, wherein the water sensor is electrically connected to the controller by an elongated wire.

6. The apparatus of claim 1, wherein the water sensor includes a pair of leads, and wherein the amount of water provides an electrical connection between the leads when the water sensor is in its activated state.

7. The apparatus of claim 6, wherein the amount of water is originated from the toilet.

8. The apparatus of claim 1, further comprising a first hose for fluidly connecting the valve to the external water supply, and a second hose for fluidly connecting the valve to the toilet.

9. The apparatus of claim 8, wherein the valve includes a valve body having a first end and a second end opposite the first end, a first fitting connected to the first end of the valve, a second fitting connected to the second end of the valve, a first tube connected to the first fitting, a second tube connected to the second fitting, a third fitting connected to the first tube and the first hose, and a fourth fitting connected to the second tube and the second hose.

10. The apparatus of claim 3, further comprising a control panel, a first electrical connector electrically connected to the control panel, and a second electrical connector electrically connected to the valve, and wherein the first and second electrical connectors are adapted to removably mate with one another.

11. The apparatus of claim 10, wherein the housing includes a base and a cover removably attached to the base, the cover having an external surface, and wherein the control panel is positioned within the cover and accessible by a user from the external surface thereof.

12. The apparatus of claim 10, further comprising a power supply.

13. The apparatus of claim 12, wherein the power supply includes at least one battery.

14. The apparatus of claim 10, wherein the control panel includes at least one visual indicator indicating the status of the valve being either in its open position or its closed position, and an audible indicator indicating the valve being in its closed position.

15. The apparatus of claim 1, wherein the housing is adapted to be removably attached to a wall of a structure and positioned proximate to and intermediate the water supply and the toilet.

16. The apparatus of claim 1, wherein the water sensor is removably attached to the valve.

17. The apparatus of claim 10, wherein the apparatus is adapted to wirelessly communicate with a remote computer to provide visual and audible alerts to the computer concerning a status of the apparatus.

18. A system, comprising:
a toilet installed on a floor of a structure, the toilet including a toilet base attached to the floor; and
an apparatus including a housing; a valve located within the housing, the valve being adapted to fluidly connect to an external toilet and an external water supply that provides water to the toilet, wherein the valve includes an open position, in which the water supply is enabled to supply water to the toilet, and a closed position, in which the external water supply is prevented from supplying water to the toilet; and a water sensor electrically connected to the valve and mounted to the base of the toilet proximate to the floor, wherein the water sensor is operable between an inactivated state, in which the water sensor is substantially dry, and an activated state, in which the water sensor is subjected to an amount of water, wherein when the water sensor is in its activated state, the valve is moved to its closed position.

* * * * *